United States Patent

Suzuki et al.

[11] Patent Number: 5,922,811
[45] Date of Patent: Jul. 13, 1999

[54] ETHYLENE PROPYLENE RUBBER BLEND AND HOSE FORMULATED FROM THE SAME

[75] Inventors: Atsushi Suzuki, Inazawa; Masayoshi Ichikawa, Ichinomiya; Kiyomitsu Terashima, Nagoya, all of Japan

[73] Assignee: Toyoda Gosei Co., Ltd., Aichi-Ken, Japan

[21] Appl. No.: 08/698,199

[22] Filed: Aug. 15, 1996

[30] Foreign Application Priority Data

Aug. 30, 1995 [JP] Japan .................................. 7-246879

[51] Int. Cl.⁶ ........................................................ C08L 23/00
[52] U.S. Cl. ........................ 525/240; 525/210; 525/211; 524/432; 524/322; 524/418
[58] Field of Search ..................... 525/240, 210, 525/211; 524/432, 322, 418

[56] References Cited

U.S. PATENT DOCUMENTS 5,162,441 11/1992 Nakata et al. .
5,279,874 1/1994 Ichikawa et al. .
5,677,382 10/1997 Tsuji et al. .................... 525/237

FOREIGN PATENT DOCUMENTS 59-22943 2/1984 Japan .

Primary Examiner—José G. Dees
Assistant Examiner—Michael A. Williamson
Attorney, Agent, or Firm—Pillsbury Madison & Sutro LLP

[57] ABSTRACT

An ethylene propylene rubber blend containing an ethylene-α-olefin-diene copolymer as the rubber component of the blend. The ethylene-α-olefin-diene copolymer has a propylene content of about 43% to about 51% by weight, an iodine value of about 33 to about 39, a Mooney viscosity ($ML_{1+4}$ 100° C.) of about 34 to about 44, and a molecular weight distribution ($M_W/M_N$) of about 5 or less. The ethylene propylene rubber blend can be used, for example, for formulating articles such as hoses, and in particular brake hoses. At least an inner tube provided inside the hose is preferably formed of the ethylene propylene rubber blend. The ethylene propylene rubber blends have a modulus of elasticity not significantly dependent upon temperature and are excellent in compression set and processability.

9 Claims, 1 Drawing Sheet

ETHYLENE PROPYLENE RUBBER BLEND AND HOSE FORMULATED FROM THE SAME

CROSS REFERENCE

The priority application, Japanese Patent Application No. 07-246879, filed in Japan on Aug. 30, 1995, is hereby incorporated into the present specification by reference.

BACKGROUND OF THE INVENTION

1. Field of the Invention

The present invention relates to an ethylene propylene rubber blend containing an ethylene-α-olefin-diene copolymer having at least propylene as its α-olefin component (hereinafter referred to as "EPDM"), the EPDM being the rubber component of the blend. The present invention further relates to a hose formulated from the same.

2. Description of Related Art

Hitherto, the materials for a rubber layer of inner tubes of brake hoses, etc. have mainly been composed of styrene-butadiene rubber (hereinafter referred to as "SBR").

EPDM tends to be used in place of SBR due to recent demands for maintenance-free cars, increased temperatures of working atmospheres for brake fluids, and the use of high boiling brake fluids. However, brake hoses comprising EPDM suffer from the problems that they are high in compression set and the modulus of elasticity greatly changes depending upon the temperature. In an attempt to improve these characteristics of brake hoses, it has been proposed to use specific EPDM vulcanized with peroxides (U.S. Pat. No. 5,162,441). This peroxide-vulcanized product is difficult to knead and, in addition, cannot be smoothly extruded and is inferior in processability.

SUMMARY OF THE INVENTION

It is therefore an object of the present invention to overcome the aforementioned problems associated with the related art by providing ethylene propylene rubber blends in which the elasticity is not significantly temperature dependent, the compression set is low and the processability is excellent.

It is a further object to provide articles, and in particular hoses, formulated from the ethylene propylene rubber blends.

The present invention resides in an ethylene propylene rubber blend containing EPDM as the rubber component of the blend, wherein the EPDM has a propylene content of about 43% to about 51% by weight, an iodine value of about 33 to about 39, a Mooney viscosity ($ML_{1+4}$ 100° C.) of about 34 to about 44 and a molecular weight distribution $M_W/M_N$ of about 5 or less.

The present invention further resides in an article, and in particular to a hose, which is formulated from a composition comprising the aforementioned rubber blend.

These and other objects, features, and advantages of the present invention will become apparent from the following detailed description when taken in conjunction with the accompanying drawing which illustrates, by way of example, the principles of the present invention.

PREFERRED EMBODIMENTS OF THE INVENTION

Figure 1:
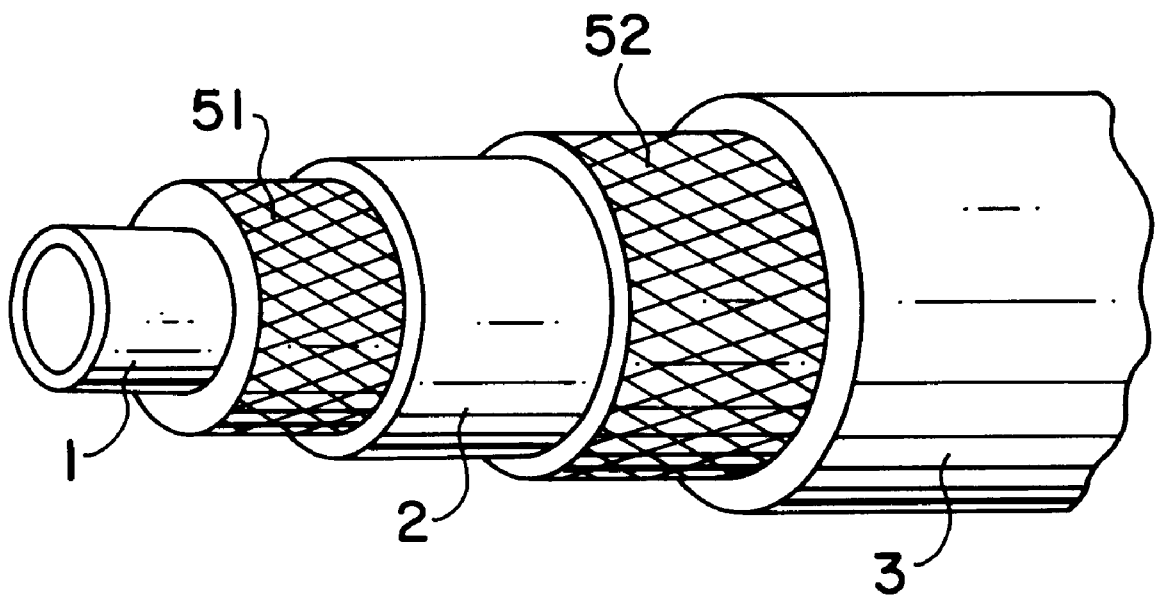
FIG. 1 is an oblique view of the hose made in accordance with Example 2.

In the ethylene propylene rubber blend of the present invention, the propylene content in EPDM is about 43% to about 51% by weight. If the content is less than about 43% by weight, the molded products of the ethylene propylene rubber blend are apt to cause problems such as exhibiting low-temperature resistance. If the content exceeds about 51% by weight, there often occur problems in the strength of the molded products.

The iodine value of EPDM is about 33 to about 39. If the iodine value is less than about 33, high strength and low compression set of the molded products can be obtained, but with difficulty. If the value exceeds about 39, preparation of the ethylene propylene rubber blend becomes difficult.

The Mooney viscosity ($ML_{1+4}$ 100° C.) of EPDM is about 34 to about 44. If it is lower than about 34, there are problems in strength of the molded products and in extrusion processability of the ethylene propylene rubber blend. On the other hand, if it exceeds about 44, there are problems in kneading and extrusion processability of the ethylene propylene rubber blend.

The molecular weight distribution ($M_W/M_N$) of EPDM is about 5 or less. The molecular weight distribution ($M_W/M_N$) is defined as a ratio of the weight-average molecular weight ($M_W$) of EPDM to the number-average molecular weight ($M_N$) of EPDM. If the molecular weight distribution exceeds about 5, strong molded products are difficult to obtain. The lower limit of $M_W/M_N$ of EPDM is unlimited, but is preferably about 2 or more from the point of productivity of the polymers.

As the α-olefin component in EPDM, propylene is ordinarily used, but 1-butene and the like can also be used in combination with propylene.

As the diene component in EPDM, there can be used non-conjugated dienes such as ethylidenenorbornene, propenylnorbornene, vinylnorbornene, dicyclopentadiene, 1,4-hexadiene, 2-methyl-1,5-hexadiene, 1,6-octadiene, 1,5-octadiene, 1,7-octadiene, 1,4-octadiene, methylhydroindene, and the like. These each can be used alone or in any combination. Furthermore, conjugated dienes such as butadiene and isoprene can be used in combination with the above non-conjugated dienes.

Since the ethylene propylene rubber blends of the present invention contain EPDM having the properties as mentioned above, the modulus of elasticity thereof is not significantly temperature dependent and they have low compression set and excellent processability.

The ethylene propylene rubber blends can optionally contain one or more of carbon black, zinc white, an age resister, a vulcanization assistant, a vulcanization accelerator, a vulcanization retardant, stearic acid, powdered sulfur, a colorant and the like in addition to the EPDM.

The carbon black can be of conventional type, but preferably is a so-called high-oil-adsorption of about 40 mg/g to about 80 mg/g and dibutyl phthalate oil absorption of at least about 140 ml/100 g, as disclosed in JP-A-59-22943, the disclosure of which is incorporated in the present specification by reference. The carbon black improves wear resistance, scoring resistance and permanent set (compression set) resistance of the ethylene propylene rubber blends.

For the vulcanization of EPDM, a sulfur vulcanization system containing zinc white as a vulcanization assistant can be used.

As the zinc white, it is preferred to use an active zinc white having a particle size of about 0.1 µm and a high activity, but general zinc white (particle size: about 0.3 µm to about 0.7 µm) can be used. The amount of zinc white is preferably about 1 to about 10 parts by weight, and more preferably about 3 to about 7 parts by weight, for 100 parts by weight of EPDM.

As the age resister, poly 2,2,4-trimethyl-1,2-dihydroquinoline and the like can be used.

The colorants used can be conventional ones.

The vulcanization accelerator and retarder are preferably blended in view of well-balanced processability and physical properties.

As the vulcanization accelerators, for example, thiazoles, dithiocarbamate salts and 4,4'-dithiobisdimorpholine can be used. The amount of vulcanization accelerator is preferably about 3 to about 7 parts by weight, for 100 parts by weight of EPDM. The above-mentioned three vulcanization accelerators are preferably used together in combination.

As the vulcanization retarders, for example, an N-phthalimide such as N-(cyclohexylthio)phthalimide can be used. The amount of the vulcanization retarder is preferably about 0.1 to about 1.0 parts by weight, for 100 parts by weight of EPDM.

Various molded articles can be obtained from the ethylene propylene rubber blend of the present invention by conventional molding methods such as extrusion molding and injection molding.

The molded articles formulated from the ethylene propylene rubber composition of the present invention include, for example, hoses and sealing parts for hydraulic cylinders.

According to the present invention, there are further provided hoses formulated from a composition including an ethylene propylene rubber blend containing EPDM as the rubber component, wherein said EPDM has a propylene content of about 43% to about 51% by weight, an iodine value of about 33 to about 39, a Mooney viscosity ($ML_{1+4}$ 100° C.) of about 34 to about 44 and a molecular weight distribution $M_W/M_N$ of about 5 or less.

The hoses are preferably such that an inner tube provided inside each hose comprises the ethylene propylene rubber blend of the present invention. This construction of the hoses can most effectively exhibit the characteristics of the ethylene propylene rubber blend, namely, temperature dependence of modulus of elasticity, compression set resistance and excellent processability. Moreover, pressure strength against the pressure of fluid flowing through the hoses increases to prolong the life of the hoses.

The hoses include, for example, brake hoses, brake reservoir hoses, and water hoses. These hoses are used, for example, in hydraulic brake or cooling system of cars.

Examples 1–7 and Comparative Examples 1–4

The ethylene propylene rubber blend of the present invention will be further explained by the following non-limiting Examples and Comparative Examples.

First, test pieces were prepared in the following manner by molding the ethylene propylene rubber blends having the compositions as shown in Table 1 and Table 2.

The ethylene propylene rubber blend each contained EPDM having a specific propylene content, iodine value, Mooney viscosity and molecular weight distribution ($M_W/M_N$), as shown in Table 1 and Table 2.

The molecular weight distribution was measured by a gel permeation chromatography (solvent: o-dichlorobenzene). The EPDM used contained propylene as the α-olefin component and ethylidenenorbornene as the diene component.

In addition to EPDM, the ethylene propylene rubber blends further contained carbon black, zinc white, stearic acid, an age resister, powdered sulfur, a vulcanization accelerator and a vulcanization retarder. The carbon black used was furnace black (iodine adsorption: 58 mg/g and dibutyl phthalate oil absorption: 158 ml/100 g). The zinc white was an active zinc white. The age resister used was Nocrac 224 (manufactured by Ohuchi Shinko Chemical Co., Ltd.), the vulcanization accelerator was Nocceler M60, Nocceler PX and Vulnoc R (manufactured by Ohuchi Shinko Chemical Co., Ltd.), and the vulcanization retarder was Santogard PVI (manufactured by Monsanto Chemical Co.).

Each of the ethylene propylene rubber blends described in Table 1 and Table 2 was subjected to a primary kneading and a secondary kneading. The primary kneading was carried out using an intermix and the secondary kneading was carried out using a Banbury mixer. Then, various test pieces were prepared from the resulting kneading products by an extrusion molding method.

Among the test pieces, E1–E7 shown in Table 1 were those of the present invention and C1–C4 shown in Table 2 were comparative test pieces.

Table 1 and Table 2 further show the results of evaluations on kneadability and extrudability of the ethylene propylene rubber blends at the time of preparation of the test pieces. The kneadability was evaluated on the material after the primary kneading. Each blend was judged to be ○ (good) when it had integrality and judged to be x (bad) when it did not have integrality. The extrudability was evaluated on surface roughness, shape retention and die swell (swelling properties) of the blend after being extruded by an extruder. When all of these properties were satisfied, the extrudability was judged to be ○ (good) and when even one of these properties was not satisfied, the extrudability was judged to be x (bad).

Next, the physical properties of the test pieces were measured. That is, ordinary state physical properties, high-temperature physical properties and compression set were measured by the following methods.

Ordinary State Physical Properties

Hardness ($H_s$), tensile strength ($T_B$), elongation ($E_B$) and 100% modulus ($M_{100}$) of the test pieces were measured at an ordinary temperature (20–25° C.) in accordance with JIS K6301 (test piece: dumbbell No. 3). The 100% modulus ($M_{100}$) was employed as an indicator for modulus of elasticity of the test pieces. The 100% modulus ($M_{100}$) is a tensile force required for elongation of the test piece by 100%.

High-Temperature Physical Properties

The 100% modulus ($M_{100}$) at 100° C. was measured in an atmosphere of 100° C. by the same method as of JIS K6301 and this was employed as an indicator for the modulus of elasticity of the test piece.

Compression Set

The measurement was carried out under the three sets of conditions of 100° C.×70 hr, 120° C.×70 hr and −30° C.×22 hr in accordance with the compression test method of JIS K6301.

The results are shown in Table 1 and Table 2.

As can be seen from the results, the test pieces of the present invention were superior in all of the processability, ordinary state physical properties and the physical properties in an atmosphere of 100° C. On the other hand, the comparative test piece C1 was inferior in processability. The test piece C2 containing a processing aid was good in processability. The test pieces C3 and C4 containing no processing aid were also good in processability.

Next, the test pieces were compared on their ordinary state physical properties and high-temperature physical properties.

As for the percentage of $M_{100}$ at high temperatures to $M_{100}$ at ordinary temperatures (high-temperature $M_{100}$/ordinary-temperature $M_{100}$), for example, the test piece E1 of the present invention showed 90% (5.3/5.9), the test piece E4 of the present invention showed 89% (5.0/5.6), and the test piece E5 of the present invention showed 90% (5.2/5.8). Thus, the test pieces of the present invention were all high, namely, about 90%. On the other hand, the comparative test pieces C1–C4 were all low, namely, 67–72%. From these results, it can be seen that the modulus of elasticity of the products of the present invention are not significantly temperature dependent.

Furthermore, the products of the present invention were also low in compression set. Especially, substantially no difference was seen in the compression set between –30° C. and 100° C. and the compression set was markedly lower than that of the comparative test pieces.

TABLE 1

|  |  |  | Example No. | | | | | | |
| --- | --- | --- | --- | --- | --- | --- | --- | --- | --- |
|  |  |  | 1 | 2 | 3 | 4 | 5 | 6 | 7 |
|  | Test piece No. |  | E1 | E2 | E3 | E4 | E5 | E6 | E7 |
| Properties of EPDM | | Propylene content (%) | 47 | 43 | 50 | 47 | 47 | 47 | 47 |
| | | Iodine value | 36 | 36 | 36 | 33 | 39 | 36 | 36 |
| | | Mooney viscosity ($ML_{1+4}$ 100° C.) | 39 | 39 | 39 | 34 | 44 | 39 | 39 |
| | | $M_W/M_N$ | 3.4 | 3.4 | 3.4 | 3.4 | 3.4 | 2.5 | 4.8 |
| Composition (part by weight) | | EPDM | 100 | 100 | 100 | 100 | 100 | 100 | 100 |
| | | Carbon black | 50 | 50 | 50 | 50 | 50 | 50 | 50 |
| | | Processing aid | — | — | — | — | — | — | — |
| | | Zinc white | 5 | 5 | 5 | 5 | 5 | 5 | 5 |
| | | Stearic acid | 3 | 3 | 3 | 3 | 3 | 3 | 3 |
| | | Age resister | 1.5 | 1.5 | 1.5 | 1.5 | 1.5 | 1.5 | 1.5 |
| | | Powdered sulfur | 0.6 | 0.6 | 0.6 | 0.6 | 0.6 | 0.6 | 0.6 |
| | | Vulcanization accelerator | 4.75 | 4.75 | 4.75 | 4.75 | 4.75 | 4.75 | 4.75 |
| | | Vulcanization retarder | 0.7 | 0.7 | 0.7 | 0.7 | 0.7 | 0.7 | 0.7 |
| | | Total | 165.55 | 165.55 | 165.55 | 165.55 | 165.55 | 165.55 | 165.55 |
| Physical properties | Processability | Kneadability | ○ | ○ | ○ | ○ | ○ | ○ | ○ |
| | | Extrudability | ○ | ○ | ○ | ○ | ○ | ○ | ○ |
| | Ordinary state physical properties | $H_S$ (JIS · A) | 80 | 80 | 80 | 80 | 80 | 80 | 80 |
| | | $T_B$ (Kg/cm²) | 16.7 | 17.1 | 16.8 | 16.8 | 17.3 | 16.9 | 16.0 |
| | | $E_B$ (%) | 330 | 340 | 340 | 330 | 340 | 330 | 350 |
| | | $M_{100}$ (M · Pa) | 5.9 | 5.8 | 5.6 | 5.6 | 5.8 | 5.9 | 5.8 |
| | High-temperature physical properties | $M_{100}$ (M · Pa) | 5.3 | 5.2 | 5.0 | 5.0 | 5.2 | 5.2 | 5.1 |
| | Compression set (%) | 100° C. × 70 h | 31 | — | — | 33 | 34 | — | — |
| | | 120° C. × 70 h | 56 | — | — | 57 | 56 | — | — |
| | | –30° C. × 2 h | 24 | 34 | 25 | 25 | 23 | 24 | 24 |

TABLE 2

|  |  |  | Comparative Example No. | | | |
| --- | --- | --- | --- | --- | --- | --- |
|  |  |  | 1 | 2 | 3 | 4 |
|  | Test piece No. |  | C1 | C2 | C3 | C4 |
| Properties of EPDM | | Propylene content (%) | 47 | 47 | 43 | 43 |
| | | Iodine value | 30 | 30 | 16 | 6 |
| | | Mooney viscosity ($ML_{1+4}$ 100° C.) | 48 | 48 | 42 | 47 |
| | | $M_W/M_N$ | 4.1 | 4.1 | 6.3 | 3.5 |
| Composition (part by weight) | | EPDM | 100 | 90 | 100 | 100 |
| | | Carbon black | 50 | 55 | 50 | 50 |
| | | Processing aid | — | 15 | — | — |
| | | Zinc white | 5 | 5 | 5 | 5 |
| | | Stearic acid | 3 | 3 | 3 | 3 |
| | | Age resister | 1.5 | 1.5 | 1.5 | 1.5 |
| | | Powdered sulfur | 0.6 | 0.6 | 0.6 | 0.6 |
| | | Vulcanization accelerator | 4.75 | 4.75 | 4.75 | 4.75 |
| | | Vulcanization retarder | 0.7 | 0.7 | 0.7 | 0.7 |
| | | Total | 165.55 | 175.55 | 165.55 | 165.55 |
| Physical properties | Processability | Kneadability | x | ○ | ○ | ○ |
| | | Extrudability | x | ○ | ○ | ○ |

TABLE 2-continued

|  |  | Comparative Example No. | | | |
| --- | --- | --- | --- | --- | --- |
|  |  | 1 | 2 | 3 | 4 |
| Test piece No. | | C1 | C2 | C3 | C4 |
| Ordinary | $H_S$ (JIS · A) | 77 | 81 | 80 | 78 |
| state | $T_B$ (Kg/cm$^2$) | 12.7 | 15.7 | 14.7 | 14.0 |
| physical | $E_B$ (%) | 310 | 310 | 380 | 630 |
| properties | $M_{100}$ (M · Pa) | 4.6 | 7.1 | 4.8 | 2.9 |
| High-temperature physical properties | $M_{100}$ (M · Pa) | 3.3 | 5.1 | 3.2 | 2.0 |
| Compression | 100° C. × 70 h | 43 | 41 | 60 | 86 |
| set | 120° C. × 70 h | 60 | 57 | 69 | 90 |
| (%) | −30° C. × 2 h | 67 | 67 | 72 | 81 |

From the above, it can be seen that the products of the present invention have low temperature dependence of the modulus of elasticity, have low compression set and excellent processability.

Example 8

In this example, a hose was produced using the ethylene propylene rubber blend of the present invention.

As shown in FIG. 1, the hose 10 of this example has an inner tube 1 and an outer tube 3 which comprise the ethylene propylene rubber blend and an intermediate tube 2 comprising a natural rubber. Reinforcing yarn layers 51 and 52 are provided between the inner tube 1 and the intermediate tube 2 and between the intermediate tube 2 and the outer tube 3, respectively. The reinforcing yarns used for the reinforcing yarn layers 51 and 52 are preferably of PET (polyester), PVA (polyvinyl alcohol), rayon and the like.

The same ethylene propylene rubber blend as of the test piece E1 in Example 1 was used in this example.

When the above hose was used as a brake hose, the hose was high in pressure strength against brake fluid pressure and low in compression set. The elasticity of the hose showed substantially no change with change in temperature. The hose had a long life.

Although the present invention has been described in detail with reference to its presently preferred embodiments, it will be understood by those of ordinary skill in the art that various modifications and improvements to the present invention are believed to be apparent to one skilled in the art. All such modifications and improvements are intended to be included within the scope of the appended following claims.

What is claimed is:

1. An ethylene propylene rubber blend containing an ethylene-α-olefin-diene copolymer and at least one additive, wherein said ethylene-α-olefin-diene copolymer has a propylene content of about 43% to about 51% by weight, an iodine value of about 33 to about 39, a Mooney viscosity ($ML_{1+4}$ 100° C.) of about 34 to about 44, a percent ratio ($M_{100}$ at 100° C./$M_{100}$ at 20–25° C.) equaling at least 88%, and a molecular weight distribution Mw/Mn of about 5 or less.

2. The rubber blend according to claim 1, wherein ethylidenenorbornene is the diene component of the blend.

3. The rubber blend according to claim 1, further containing at least one member selected from the group consisting of carbon black, zinc white, stearic acid, an age resister, powdered sulfur, a vulcanization accelerator and a vulcanization retarder.

4. The rubber blend according to claim 1, which further contains 1 to 10 parts by weight of zinc white, as a vulcanization assistant, for 100 parts by weight of the ethylene-α-olefin-diene copolymer and is vulcanized.

5. The rubber blend according to claim 2, which further contains 1 to 10 parts by weight of zinc white, as a vulcanization assistant, for 100 parts by weight of the ethylene-α-olefin-diene copolymer and is vulcanized.

6. The rubber blend according to claim 4, which further contains 3 to 7 parts by weight of at least one vulcanization accelerator selected from the group consisting of a thiazol, a dithiocarbamate salt and 4,4'-dithiobisdimorpholine, and 0.1 to 1 part by weight of an N-phthalimide as a vulcanization retarder.

7. The rubber blend according to claim 5, which further contains 3 to 7 parts by weight of at least one vulcanization accelerator selected from the group consisting of a thiazol, a dithiocarbamate salt and 4,4'-dithiobisdimorpholine, and 0.1 to 1 part by weight of an N-phthalimide as a vulcanization retarder.

8. The rubber blend according to claim 6, wherein said vulcanization accelerator is a combination of a thiazole, a dithiocarbamate salt and 4,4'-dithiobisdimorpholine.

9. The rubber blend according to claim 7, wherein said vulcanization accelerator is a combination of a thiazole, a dithiocarbamate salt and 4,4'-dithiobisdimorpholine.

* * * * *